(12) United States Patent
Li et al.

(10) Patent No.: US 10,418,883 B2
(45) Date of Patent: Sep. 17, 2019

(54) COVER ASSEMBLY AND MOTOR

(71) Applicant: JOHNSON ELECTRIC INTERNATIONAL AG, Murten (CH)

(72) Inventors: Min Li, Shenzhen (CN); Jin Jin Wu, Shenzhen (CN); Kok Ang Chong, Hong Kong (CN); Cheng Zhuang Zhu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 431 days.

(21) Appl. No.: 15/240,307

(22) Filed: Aug. 18, 2016

(65) Prior Publication Data

US 2017/0054345 A1 Feb. 23, 2017

(30) Foreign Application Priority Data

Aug. 21, 2015 (CN) .................. 2015 2 0639412 U

(51) Int. Cl.
*H02K 9/28* (2006.01)
*H02K 9/06* (2006.01)
(Continued)

(52) U.S. Cl.
CPC ........... *H02K 9/28* (2013.01); *F04D 25/0606* (2013.01); *F04D 25/082* (2013.01);
(Continued)

(58) Field of Classification Search
CPC .......... H02K 5/14; H02K 5/141; H02K 5/143; H02K 5/146; H02K 5/148; H02K 5/24; H02K 13/00; H02K 13/003; H02K 13/006; H02K 13/02; H02K 13/04; H02K 13/10; H02K 13/105; H02K 13/12; H02K 13/14; H02K 9/28; H02K 11/026; H02K 23/00; H02K 23/023; H02K 23/18; H02K 23/20;
(Continued)

(56) References Cited

U.S. PATENT DOCUMENTS 2,693,312 A * 11/1954 Lanter ................... F04D 25/082
15/330
4,120,616 A * 10/1978 Dwyer .................. F04D 25/082
15/326
(Continued)

*Primary Examiner* — Julio C. Gonzalez
*Assistant Examiner* — Alexander A Singh
(74) *Attorney, Agent, or Firm* — Muncy, Geissler, Olds & Lowe, P.C.

(57) ABSTRACT

A cover assembly and a brushed motor are provided. The cover assembly includes a mounting portion and a flow guide portion. The mounting portion defines a first opening through the mounting portion along an axial direction of the motor. The flow guide portion includes a top wall disposed at one end thereof away from the mounting portion along the motor axial direction. The fluid guide portion defines a second opening extending to an inner wall surface of the top wall in the motor axial direction. The first opening and the second opening are in flow communication with each other. The flow guide portion further defines a winding flow passage. The flow passage has an inner inlet in flow communication with the second opening and an outer outlet in flow communication with an outside environment. The present invention facilitates absorption of the motor noise and hence reduction of the output noise.

16 Claims, 4 Drawing Sheets

(51) Int. Cl.
*H02K 5/20* (2006.01)
*F04D 29/58* (2006.01)
*H02K 5/14* (2006.01)
*H02K 5/04* (2006.01)
*H02K 5/24* (2006.01)
*F04D 25/06* (2006.01)
*F04D 25/08* (2006.01)
*F04D 29/42* (2006.01)
*H02K 5/22* (2006.01)

(52) U.S. Cl.
CPC ..... *F04D 29/4226* (2013.01); *F04D 29/5806* (2013.01); *H02K 5/04* (2013.01); *H02K 5/14* (2013.01); *H02K 5/148* (2013.01); *H02K 5/20* (2013.01); *H02K 5/225* (2013.01); *H02K 5/24* (2013.01); *H02K 9/06* (2013.01)

(58) Field of Classification Search
CPC ... H02K 5/04; H02K 5/18; H02K 9/22; H01R 39/00; H01R 39/02; H01R 39/022; H01R 39/025; H01R 39/027; H01R 39/04; H01R 39/045; H01R 39/06; H01R 39/08; H01R 39/085; H01R 39/10; H01R 39/12; H01R 39/14; H01R 39/16; H01R 39/18; H01R 39/20; H01R 39/22; H01R 39/24; H01R 39/26; H01R 39/27; H01R 39/28; H01R 39/30; H01R 39/32; H01R 39/34; H01R 39/36; H01R 39/38; H01R 39/381; H01R 39/383; H01R 39/385; H01R 39/386; H01R 39/39; H01R 39/40; H01R 39/41; H01R 39/415; H01R 39/42; H01R 39/44; H01R 39/46; H01R 39/48; H01R 39/50; H01R 39/52; H01R 39/54; H01R 39/56; H01R 39/58; H01R 39/59; H01R 39/60; H01R 39/62; H01R 39/64; H01R 39/643; H01R 39/646

USPC ....... 310/148, 151, 219–253, 52, 53, 54, 55, 310/56, 57, 58, 59, 60 R, 61, 62, 63, 310/60 A, 64, 89, 400–418

See application file for complete search history.

(56) References Cited

U.S. PATENT DOCUMENTS

| | | | | |
|---|---|---|---|---|
| 5,448,118 A | * | 9/1995 | Nakamura | ............... H02K 5/20 310/54 |
| 6,142,732 A | * | 11/2000 | Chou | ...................... F01D 9/026 415/119 |
| 2003/0024070 A1 | * | 2/2003 | Theiss | ....................... A47L 5/22 15/413 |
| 2014/0111040 A1 | * | 4/2014 | Badafem | ................ H02K 5/148 310/51 |

* cited by examiner

COVER ASSEMBLY AND MOTOR

CROSS REFERENCE TO RELATED APPLICATIONS

This non-provisional patent application claims priority under 35 U.S.C. § 119(a) from Patent Application No. 201520639412.X filed in The People's Republic of China on Aug. 21, 2015.

FIELD OF THE INVENTION

The present invention relates to a cover assembly for a motor and a motor combined the cover assembly.

BACKGROUND OF THE INVENTION

A conventional brushed motor with air cooling comprises a stator, a rotor, and a cooling fan rotating along with the rotor. A cover is disposed at one end of the stator. The fan is disposed in the cover and generates airflow passing through a rotor core in an axial direction to take away heat from an interior of the motor.

BRIEF DESCRIPTION OF THE DRAWINGS

The drawings to be used in the description of embodiments of the disclosure or the conventional technology are described briefly as follows, so that technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

Figure 1:
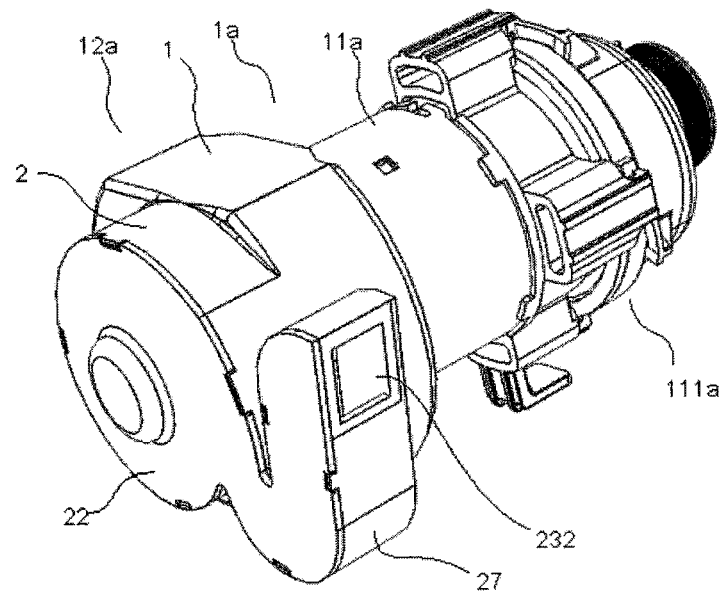
FIG. 1 is a perspective view of a motor according to one embodiment of the present invention.

While the features described herein may be susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the subject matter as defined by the appended claims.

DETAILED DESCRIPTION OF THE PREFERRED EMBODIMENTS

Below, embodiments of the present invention will be described in greater detail with reference to the drawings.

Figure 2:
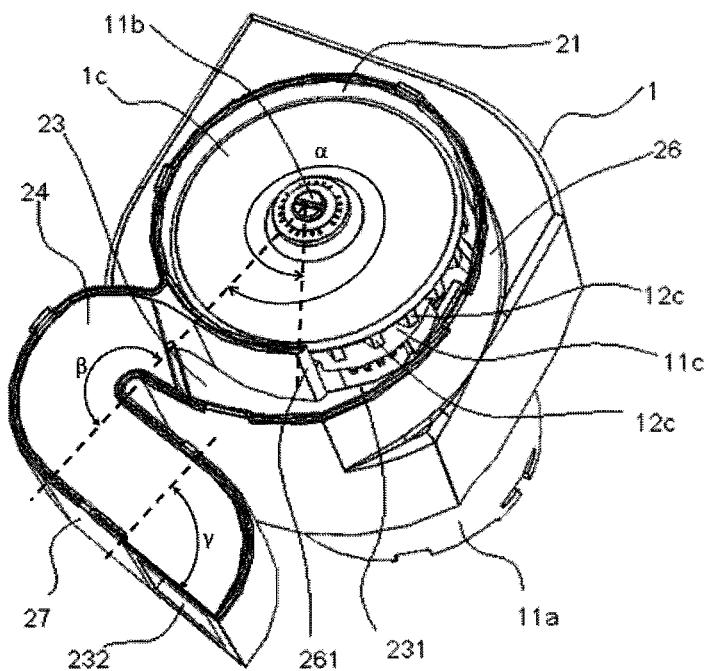
FIG. 2 to FIG. 7 illustrate partial structures of the brushed motor according to one embodiment of the present invention.
Figure 3:
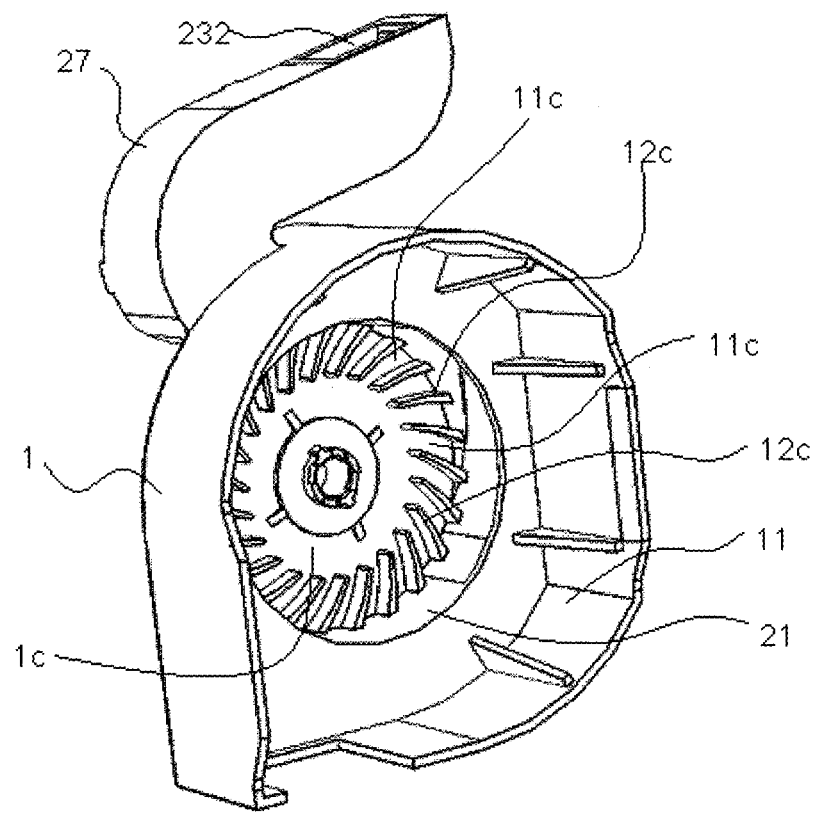
Figure 4:
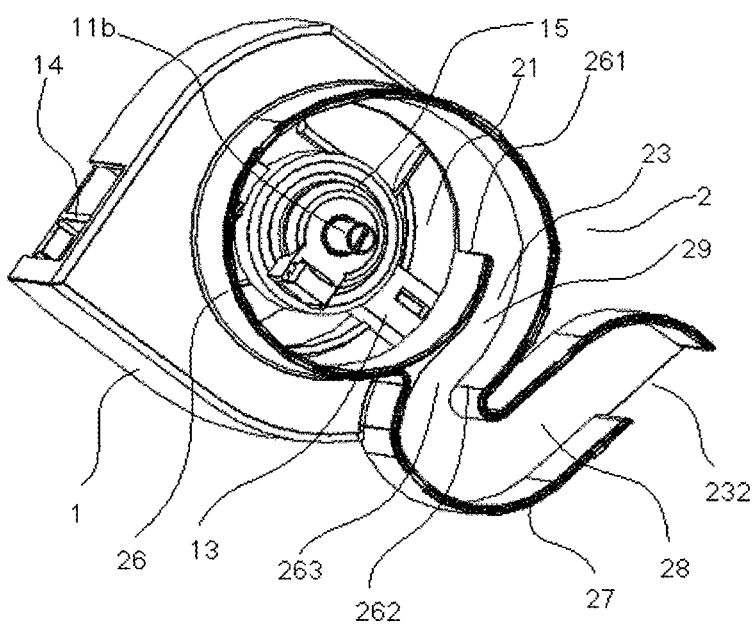
Figure 5:
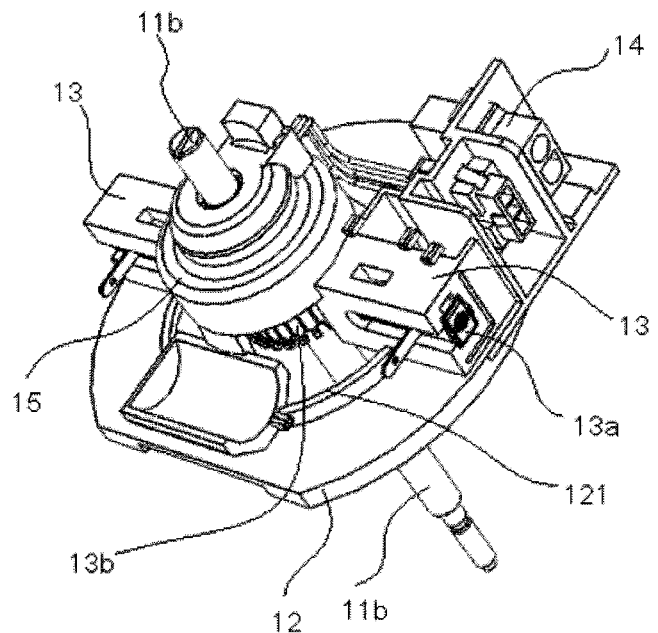
Figure 6:
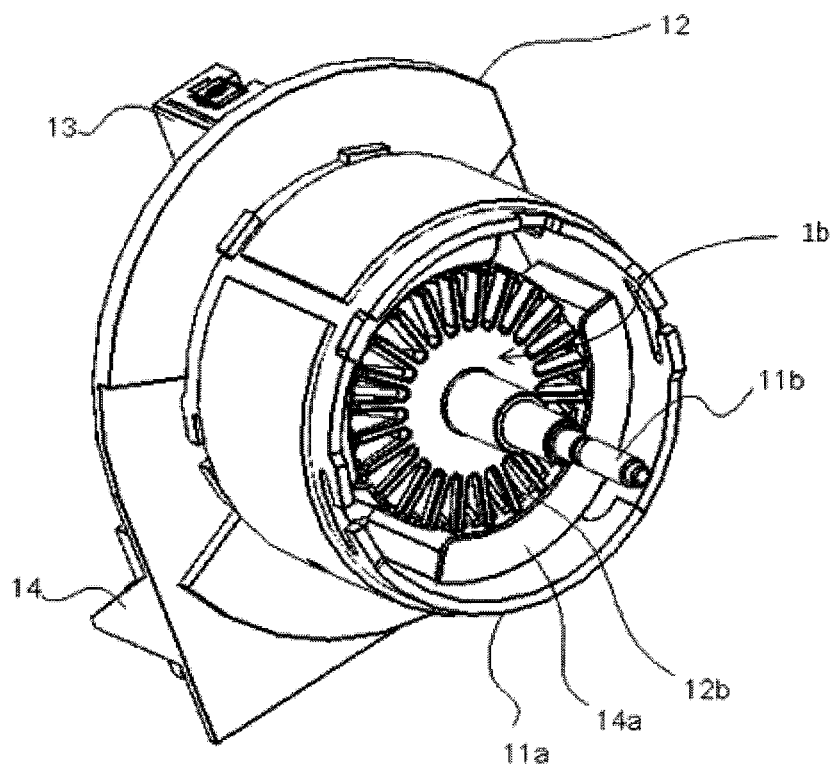

FIG. 1 to FIG. 7 illustrate a brush motor in accordance with one embodiment of the present invention. The brush motor comprises a stator 1a, a rotor 1b, and an impeller 1c. As shown in FIG. 5 and FIG. 6, the rotor 1b comprises a rotary shaft 11b, a rotor core 12b fixed to the rotary shaft 11b, and a commutator 13b adjacent the rotor core 12b fixed to the rotary shaft 11b. As shown in FIG. 1, FIG. 5 and FIG. 6, the stator 1a comprises a housing 11a, a permanent magnet 14a fixed in the housing 11a, a cover assembly 12a fixed to the housing 11a, and at least a pair of brushes 13a mounted to the cover assembly 12a for frictionally contacting the commutator 13b. As shown in FIG. 1 to FIG. 4, the cover assembly 12a comprises a mounting portion 1 and a flow guide portion 2 overlapped each other along an axial direction of the motor. The cover assembly 12a is fixed to the housing 11a through the mounting portion 11a. A central area of the mounting portion 1 defines a first opening 11 through the mounting portion 1 along the axial direction of the motor, and the first opening 11 is in fluid communication with an interior of the housing 11a. The flow guide portion 2 comprises a top wall 22 disposed at one end thereof away from the mounting portion 1 along the axial direction of the motor. A second opening 21 is defined in a central area of the flow guide portion 2, which extends to an inner wall surface of the top wall 22 in the axial direction of the motor. The first opening 11 and the second opening 21 are in flow communication with each other. As shown in FIG. 2 and FIG. 3, the impeller 1c is capable of rotating with the rotor 1b and forms flow passageways 11c in flow communication with the first opening 11 of the cover assembly 12a. As shown in FIG. 2 and FIG. 4, the flow guide portion further defines a winding flow passage 23. An inner inlet 231 of the flow passage 23 is disposed downstream of the impeller 1c, and communicates with the flow passageways 11c of the impeller 1c through the second opening 21. An outer outlet 232 of the flow passage 23 communicates with the outside environment. As such, the fluid exiting the impeller 1c is exhausted out of the motor through the flow passage 23.

As shown in FIG. 2 and FIG. 3, the impeller 1c comprises a plurality of evenly spaced blades 12c. All the blades 12c are extend from a radial inside to a radial outside and are deflected from a radial direction of the impeller 1c toward the same circumferential direction. A flow passageway 11c is formed between each two adjacent blades 12c. Understandably, the flow passageways 11c are also extend from the radial inside to the radial outside and are deflected from the radial direction of the impeller 1c toward the same circumferential direction.

Referring to FIG. 4, the rotary shaft 11b is inserted through the first opening 11 into the second opening 21. The impeller 12c is fixed to the rotary shaft 11b and disposed in the second opening 21. As shown in FIG. 4, FIG. 5 and FIG. 6, the mounting portion 1 further comprises a base 12, brush holders 13, a terminal holder 14 and a bearing seat 15. The base 12 is fixed to the housing 11a. Brushes 13a are disposed in the respective brush holders 13. The bearing seat 15 is disposed in the first opening 11 and is mounted to the rotary shaft 11b through a bearing. The terminal holder 14 is disposed at a sidewall of the mounting portion 1, for mounting connecting terminals (not shown). The rotary shaft 11b passes through a through hole 121 in a center of the base 12. The brush holders 13 are fixed to the base 12 and disposed in the first opening 11. A radial inner end of each brush holder 13 is fixedly connected to the bearing seat 15, such that the bearing seat 15 is fixed to the base 12 and is fixed to the housing 11a through the base 12. A radius of the through hole 121 of the center of the base 12 is greater than a radius of the rotor core 12b, which facilitates the air in the housing 11a flowing to the through hole 121 and then into the first opening 11 through the gap between the rotor magnetic core 12b and the housing 11a, wherein the air enters the housing 11a via an end bracket 111a of the housing 11a.

In at least one embodiment, as shown in FIG. 2, a carbon powder absorber 24 such as a sponge is disposed in the flow passage 23 to absorb carbon powder, thus preventing the carbon powder from drifting out of the motor to pollute the outside environment or affect other facilities and also reducing carbon powder accumulation in other areas inside the motor.

Figure 7:
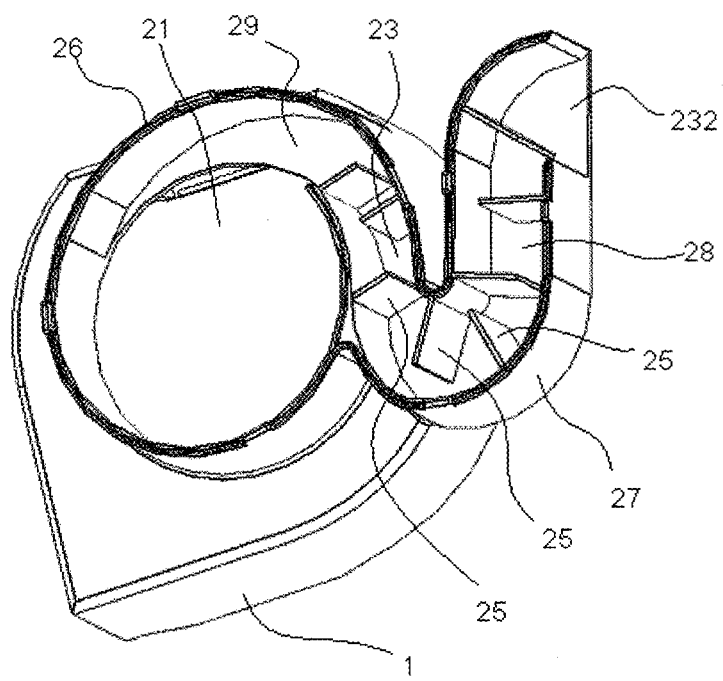

Referring to FIG. 7, a plurality of spaced ribs 25 can be disposed in the flow passage 23. In at least one embodiment, one rib 25 is disposed on an inner wall surface at one side of the flow passage 23, between each two adjacent ribs on an inner wall surface at the other of the flow passage 23, which increases the tortuosity of the flow passage 23 and hence enhances the noise absorption capability.

The flow guide portion 2 may have various specific structures. Referring to FIG. 4, in a first embodiment, the flow guide portion 2 comprises an annular wall 26. The annular wall 26 extends from a starting end 261 to a terminating end 262, surrounding a radial outer edge of the second opening 21. The annular wall 26 extends over an angle greater than 275 degrees in a radial plane of the flow guide portion 2. As shown in FIG. 4, the flow guide portion 2 further comprises a flow guide nozzle 27. A flow channel 28 is defined through a center area of the flow guide nozzle 27. An inlet of the flow channel 28 connects with an outlet 263 formed by the annular wall 26. The flow channel 28 extends from its inlet to its outlet in a winding direction. As one construction, the angle the annular wall 26 extends over between its starting end 261 and its terminating end 262 is greater than 275 degrees and less than 360 degrees, in which case, the flow channel 28 is the whole flow passage 23. As another construction, as shown in FIG. 2 and FIG. 4, the angle the annular wall 26 extends over between its starting end 261 and its terminating end 262 is greater than 360 degrees. The flow guide portion 2 further comprises a bottom wall 29. A portion of the annular wall 26 adjacent the starting end 261 and a portion of the annular wall 26 adjacent the terminating end 262 are disposed in parallel to define a space therebetween. This space is closed at its top by the top wall 22 and closed at its bottom by the bottom wall 29, thus forming a segment of the flow passage 23 and cooperating with the flow channel 28 to form the whole flow passage 23. Preferably, the annular wall 26 extends spirally outwardly from its starting end 261 to its terminating end 262 over an angle greater than 365 degrees in the radial plane, surrounding the radial outer edge of the second opening 21, such that the air exiting the impeller 1c flows a distance along a circumferential direction, which facilitates making the most of the space and reducing noise.

In a second embodiment, the flow guide portion 2 comprises an annular wall 26 and a bottom wall 29. The annular wall 26 extends spirally outwardly from its starting end 261 to its terminating end 262 over an angle greater than 360 degrees in the radial plane. A portion of the annular wall 26 adjacent the starting end 261 and a portion of the annular wall 26 adjacent the terminating end 262 are disposed in parallel which define a space therebetween. The space is closed at its top by the top wall 22 and closed at its bottom by the bottom wall 29, thus forming the whole flow passage 23. Preferably, the angle the annular wall 26 extends over in the radial plane from its staring end 261 to its terminating end 262 is greater than 545 degrees and less than 715 degrees. As shown in FIG. 2, the angle of the annular wall 26 includes an angle α between its staring end 261 to its terminating end 262, and an angle β and an angle γ of the extending flow channel 28 along the air flowing direction in the whole flow passage 23. As such, the air flows spirally outwardly along the same circumferential direction surrounding the second opening 21 and finally out of the flow passage.

Although the invention is described with reference to one or more preferred embodiments, it should be appreciated by those skilled in the art that various modifications are possible. Therefore, the scope of the invention is to be determined by reference to the claims that follow.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A cover assembly for a motor, comprising:
   a mounting portion comprising a first opening passing through the mounting portion;
   a flow guide portion overlapped with the mounting portion and comprising a top wall disposed at one end thereof and away from the mounting portion, a central area of the fluid guide portion defining a second opening extending to the top wall in the axial direction of the motor, the first opening and the second opening being in flow communication with each other; and
   the flow guide portion further comprising a flow passage, the flow passage comprising an inner inlet in flow communication with the second opening and an outer outlet;
   wherein the flow guide portion comprises a bottom wall and an annular wall, the annular wall extends spirally outwardly from its starting end to its terminating end, an angle of the annular wall extended over in a radial plane of the flow guide portion is greater than 545 degrees and less than 715 degrees.

2. The cover assembly of claim 1, wherein a portion of the annular wall adjacent the starting end and a portion of the annular wall adjacent the terminating end are disposed in parallel to define a space therebetween, the space is closed at its top by the top wall and closed at its bottom by the bottom wall, and forms at least one segment of the flow passage.

3. The cover assembly of claim 1, wherein the flow guide portion comprises a flow guide nozzle and an annular wall, a flow channel is defined through a center of the flow guide nozzle, an inlet of the flow channel connects with an outlet formed by the annular wall, and the flow channel is formed in at least one segment of the flow passage.

4. The cover assembly of claim 1 wherein a flow channel extends from its inlet to its outlet in any direction.

5. The cover assembly of claim 1, wherein a carbon powder absorber is disposed in the flow passage.

6. The cover assembly of claim 5, wherein the carbon powder absorber is sponge.

7. The cover assembly of claim 1, wherein a plurality of spaced ribs is disposed in the flow passage.

8. The cover assembly of claim 7, wherein one rib is disposed on an inner wall surface at one side of the flow passage between each two adjacent ribs on the inner wall surface at the other side of the flow passage.

9. A motor, comprising:
- a rotor comprising a rotary shaft, a rotor core fixed to the rotary shaft, and a commutator fixed to the rotary shaft adjacent the rotor core;
- a stator comprising a housing, a cover assembly fixed to the housing, and at least a pair of brushes mounted in the cover assembly for frictionally contacting the commutator, the cover assembly comprising:
  - a mounting portion, a central area of the mounting portion defining a first opening through the mounting portion;
  - a flow guide portion overlapped with the mounting portion and comprising a top wall disposed at one end thereof and away from the mounting portion, a central area of the fluid guide portion defining a second opening extending to the top wall in the axial direction of the motor, the first opening and the second opening being in flow communication with each other; and
  - the flow guide portion further comprising a flow passage, the flow passage comprising an inner inlet in flow communication with the second opening and an outer outlet;
  - wherein the flow guide portion comprises a bottom wall and an annular wall, the annular wall extends spirally outwardly from its starting end to its terminating end, an angle of the annular wall extended over in a radial plane of the flow guide portion is greater than 545 degrees and less than 715 degrees; and
- an impeller rotatable along with the rotor and defining flow passageways in flow communication with the first opening, the inner inlet of the flow passage being in flow communication with the flow passageways, air exiting the impeller being discharged out of the motor through the flow passage.

10. The motor of claim 9, wherein the rotary shaft is inserted through the first opening into the second opening, and the impeller is fixed to the rotary shaft and disposed in the second opening.

11. The motor of claim 10, wherein the mounting portion further comprises a base, brush holders, and a bearing seat, the base is fixed to the housing, the brushes are disposed in the respective brush holders, the bearing seat is disposed in the first opening and is mounted to the rotary shaft through a bearing, the rotary shaft passes through a through hole in a center of the base, the brush holders are fixed to the base and disposed in the first opening, and a radial inner end of each brush holder is fixedly connected to the bearing seat.

12. The motor of claim 11, wherein a radius of the through hole of the center of the base is greater than a radius of a rotor core.

13. A cover assembly for a motor, comprising:
- a first opening defined on a mounting portion;
- a second opening defined on a fluid guide portion, the first opening and the second opening being in flow communication with each other; the flow guide portion comprising a passage; and
- the flow passage comprising an inner inlet in flow communication with the second opening and an outer outlet in flow communication with outside;
- the flow guide portion comprises a bottom wall and an annular wall, the annular wall extends spirally outwardly from its starting end to its terminating end, an angle of the annular wall extended over in a radial plane of the flow guide portion is greater than 545 degrees and less than 715 degrees.

14. The cover assembly of claim 13, wherein a portion of the annular wall adjacent the starting end and a portion of the annular wall adjacent the terminating end are disposed in parallel to define a space therebetween, the space is closed at its top by the top wall and closed at its bottom by the bottom wall, and forms at least one segment of the flow passage.

15. The cover assembly of claim 13, wherein a carbon powder absorber is disposed in the flow passage, the carbon powder absorber is sponge.

16. The cover assembly of claim 13, wherein a plurality of spaced ribs is disposed in the flow passage, one rib is disposed on an inner wall surface at one side of the flow passage between each two adjacent ribs on the inner wall surface at the other side of the flow passage.

\* \* \* \* \*